United States Patent [19]

Kessler

[11] 3,935,043

[45] Jan. 27, 1976

[54] METHOD OF MAKING WALL-REINFORCED WEATHERSTRIP

[76] Inventor: Milton Kessler, 6690 Harrington Ave., Youngstown, Ohio 44512

[22] Filed: July 24, 1974

[21] Appl. No.: 491,523

[52] U.S. Cl. ........................ 156/72; 49/475; 49/489; 156/204; 156/250; 428/88

[51] Int. Cl.² ........................ E06B 7/16; B32B 5/00

[58] Field of Search ............. 156/72, 226, 221, 227, 156/71, 148, 183, 204, 196, 250; 49/475, 49/489, 493, 480, 484, 495, 488, 485; 161/62, 161/63, 64, 67, 65, 66; 428/83, 88, 93, 96, 358

[56] References Cited

UNITED STATES PATENTS

| | | | |
|---|---|---|---|
| 3,158,518 | 11/1964 | Kessler | 156/72 |
| 3,175,256 | 3/1965 | Horton | 49/489 |
| 3,266,190 | 8/1966 | Jackson | 49/489 |
| 3,404,487 | 10/1968 | Johnson | 156/72 |
| 3,723,231 | 3/1973 | Clay et al. | 156/72 |
| 3,745,053 | 7/1973 | Johnson et al. | 49/489 |

*Primary Examiner*—Douglas J. Drummond
*Assistant Examiner*—Michael W. Ball
*Attorney, Agent, or Firm*—Max L. Libman

[57] ABSTRACT

A method of making pile weatherstripping of the type having a strip of velvet-like pile material reinforced by one or more longitudinally-extending walls of plastic imbedded in or alongside the pile material, by forming such walls of the base sheeting which supports and retains the pile material. The pile material is applied in spaced parallel strips on the base sheeting, which is then cut between the strips and bare portions of the sheeting, and folded and adhered together to form the reinforcing walls, which also add to the weathersealing effectiveness of the assembly.

2 Claims, 6 Drawing Figures

FIG. 1.
(Prior Art)
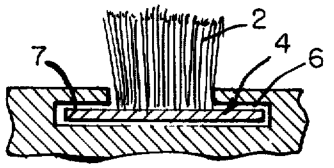
FIG. 2.
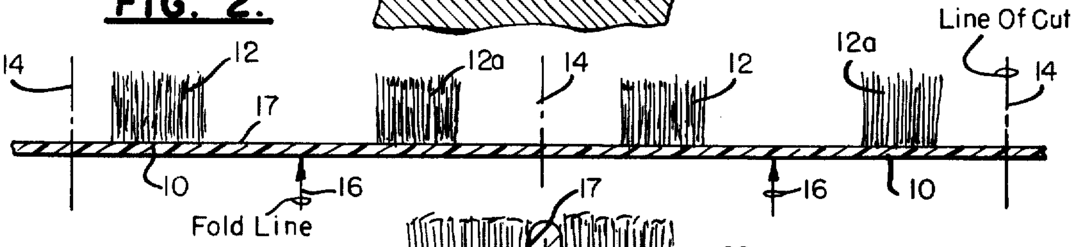
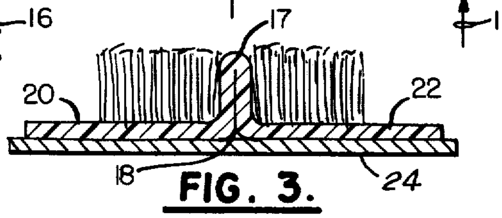
FIG. 3.
FIG. 6.
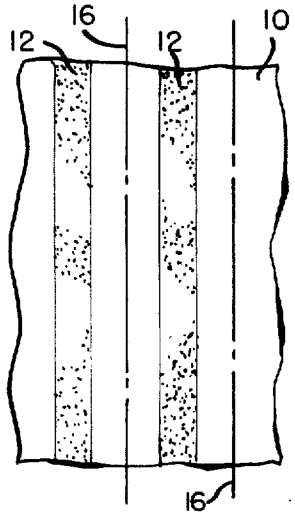
FIG. 4.
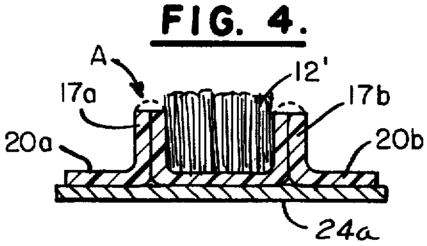
FIG. 5.
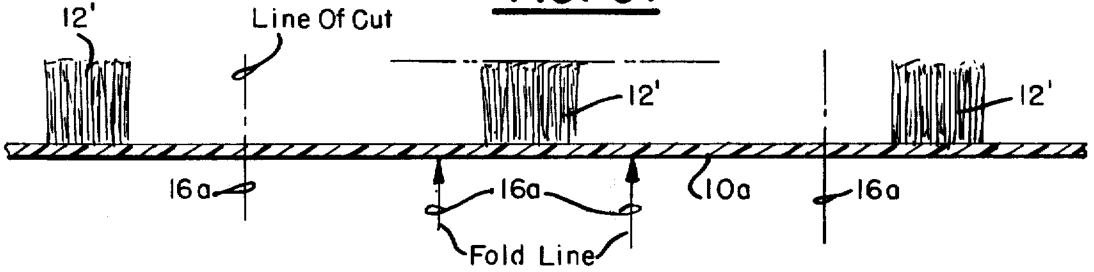

METHOD OF MAKING WALL-REINFORCED WEATHERSTRIP

Pile weatherstripping is a standard article of commerce, widely used on windows and doors to seal the edges thereof against the entrance of cold air, moisture, etc. A common form consists of a strip of pile material, that is somewhat like velvet, applied to a strip of base material, with the base material extending out on either side of the strip of pile material so that it can be slipped into a retaining groove on the door, window, etc., and be held in place by the retaining edges thus formed, as is well known. The pile material may be composed of threads of fabric material sewn into the base material or otherwise attached thereto, or in a less expensive form of weatherstripping may be formed of flocking adhered to the base material. In one form of weatherstripping, an upstanding wall of thin, flexible sheet material is incorporated into the pile material in order to lend its support and also to increas its imperviousness to the passage of air or moisture. This upstanding strip of sheet material is usually a different material from the base strip to which the piling is fixed and its use adds appreciably to the expense of making the weatherstrip. The present invention relates to a method of making this general type of weatherstripping in a more simple and less expensive manner than has heretofore been the case. According to the present invention, the weatherstripping is made by applying parallel longitudinal strips of lines of piling to a continuous sheet of thin flexible material such as thin sheeting of suitable plastic material, e.g. polypropylene. This is preferably done as a continuous process with the sheet material being continuously passed through the fabricating station, while the piling is applied by known methods, such as applying parallel spaced lines of flocking to the sheet material, although the piling may also be of any other known form and be attached in any known way, such as by sewing, etc. The base sheet of thin plastic material is left bare between the lines of piling, for a sufficient distance to permit it to be folded up against the line of piling, as will be described in more detail hereafter. After the lines of piling are applied, the sheet of base material is cut between the lines of piling, and a portion of the exposed bare strip extending laterally away from the piling is folded up against the line of piling to form a folded wall of the thin sheet material, the dimensions of the cut being such that enough of the sheet material remains beyond the fold and lying in its original plane to form a retaining edge for the weatherstrip.

The specific nature of my invention, as well as other objects and advantages thereof, will clearly appear from a description of a preferred embodiment as shown in the accompanying drawing, in which:

FIG. 1 is a transverse sectional view of a conventional form of weatherstrip showing the manner in which it is applied and held in place;

FIG. 2 is a traverse sectional view showing a continuous line of base material with spaced lines of piling applied to it, indicating the lines of cut and the fold lines;

FIG. 3 is a transverse sectional view of a single weatherstrip after it has been cut and folded, and a backing strip applied thereto;

FIG. 4 is a similar view of a different form of weatherstrip having two supporting walls;

FIG. 5 is a view similar to FIG. 2 showing the lines of cut and fold lines for making the weatherstrip of FIG. 3; and FIG. 6 is a plan view of the sheet shown in FIG. 2.

As shown in FIG. 1, conventional weatherstripping consists of a line of pile material 2 which may be composed of individual filaments such as a velvet-like material or flocking and which forms the active portion of the weatherstrip as is well-known. The pile material is fastened in any conventional manner to a backing strip 4 which extends out laterally beyond the line of pile material as shown at 6, 7, so that it may be retained in the undercut portion of a groove 8 formed on the edge of a door or window, etc., into which the weatherstrip is longitudinally inserted in order to perform its function.

FIGS. 2 and 6 show a manner of making weatherstripping of the general type shown in FIG. 1, but with an additional supporting wall. A continuous sheet 10 of thin flexible material such as polyproplene or polyethyle 0.010 – 0.035 inch thick has applied to it by any known method a series of spaced parallel lines of piling 12. Machinery for doing this is well known in the art and need not be described in detail. The piling may be of any type, but it is preferably flocking material adhered at one end to the base sheet 10 in any known manner. The base sheet 10 may also be of any suitable woven material. At a point beyond that at which the piling is applied, the base sheet 10 is cut into longitudinal strips by cutting wheels or knives in a continuous process, the equipment for doing this being well known and conventional. The cuts are made along lines 14 so that each cut strip now has on it two parallel spaced lines of piling. At a further point along the continuous production line, the base sheet is folded, again by known machinery, along lines 16, so as to bring the two adjacent strips 12 and 12*a* together to form one continuous line of piling with the upstanding folded portion 17 between them. A suitable adhesive or glue may be applied to the interior sides of the folded portion at 18, so that the upstanding portion will retain its configuration by itself. For some uses, this procedure will now form the entire weatherstrip, and in this case, the base sheet 10 is made sufficiently rigid so that the remaining unfolded portion of the base sheet which extends out at 20 and 22 has sufficient rigidity to serve to retain the weatherstrip in its slot, similar to portions 6 and 7 shown in FIG. 1. However, in most cases, it is preferred to use a base sheet material which is too thin and flexible to serve for this purpose, and in that case a backing sheet or strip 24 is employed, which is suitably fastened to the bottom of the weatherstrip in any suitable or known manner, as by adhesives or by the application of heat. The upstanding wall 17 thus formed thus serves as a supporting wall and also as a barrier against moisture, etc.

FIG. 4 shows a weatherstrip having two upstanding walls, one on each side of the piling line, which may be formed as shown in FIG. 5 by making the line of cut between each two adjacent lines of piling, leaving enough of the bare base material 10*a* on either side of the line of piling 12′ so that when it is folded along fold lines 16*a* two upstanding walls 17*a* and 17*b* will be formed, leaving retaining edges 20*a* and 20*b* on either side of the line of piling. This has the advantage of forming a double barrier, as well as helping to support the line of piling against undue flattening and distortion.

If desired, the top edge of strip 17, 17*a*, 17*b* may be cut as shown at A in FIG. 4 to provide two edges for improved weathersealing action; in this event the adhesive at 18 is applied only at the bottom of the folded strip, leaving the cut edges free to spread apart.

I claim:

1. Method of making pile weatherstrip comprising the steps of a. applying parallel spaced continuous lines of piling to a continuous base sheet of thin flexible material, b. cutting the sheet between lines of piling to leave strips of the base material with one or more continuous lines of piling running along each strip, and the base sheet material extending out on each side from each line of piling, c. folding a portion of the bare base sheet material of the strip back on itself beside a line of said piling to form an upstanding wall of folded base sheet material alongside and adjacent to the line of pile, with the remainder of said base sheet material lying flat in its original plane and extending out away from the line of piling to form a retaining edge portion for the weatherstrip, d. fastening a backing support strip to the bottom of the weatherstrip, e. cutting the top edge of said upstanding wall of folded base sheet material along its top fold line to thus provide two upstanding walls of the base sheet material capable of spreading apart and thus providing two sealing edges instead of one.

2. The invention according to claim 1, and the further step of folding and cutting a similar portion of bare base material along the other side of the line of pile to thus form two upstanding double walls of folded sheet material, one on each side of the line of pile.

* * * * *